United States Patent
Carbajal

[19]

[11] Patent Number: 6,129,050
[45] Date of Patent: Oct. 10, 2000

[54] CANINE WASTE COLLECTION APPARATUS

[76] Inventor: Jesse V. Carbajal, 15222 Hardy Bend Dr. #52, Hacienda Heights, Calif. 91745

[21] Appl. No.: 09/262,177

[22] Filed: Mar. 4, 1999

Related U.S. Application Data

[60] Provisional application No. 60/078,376, Mar. 18, 1998.

[51] Int. Cl.[7] .................................................. A01K 29/00
[52] U.S. Cl. ............................................................ 119/165
[58] Field of Search .................................... 119/165, 166, 119/167, 168, 170

[56] References Cited

U.S. PATENT DOCUMENTS

| | | | |
|---|---|---|---|
| 3,100,474 | 8/1963 | Schneider | 119/166 |
| 4,732,111 | 3/1988 | Runion | 119/165 |
| 5,058,528 | 10/1991 | Counseller et al. | 119/165 |
| 5,460,122 | 10/1995 | Reinartz | 119/165 |
| 5,503,110 | 4/1996 | Miller | 119/166 |
| 5,566,640 | 10/1996 | Krumrei | 119/165 |
| 5,699,754 | 12/1997 | Cahajla | 119/165 |
| 5,738,040 | 4/1998 | Simmons | 119/165 |

*Primary Examiner*—Peter M. Poon
*Assistant Examiner*—Elizabeth Shan

[57] ABSTRACT

A canine waste collection apparatus for providing a location where canine pets can deposit their waste so that the waste is collected in a convenient location for easy disposal. The canine waste collection apparatus includes a base having a cavity therein and a top opening and a side opening into the cavity. A screen covers the top opening to prevent passage of objects greater than a predetermined size through the top opening. A drawer with an open top is slidably inserted through the side opening into the cavity.

19 Claims, 3 Drawing Sheets

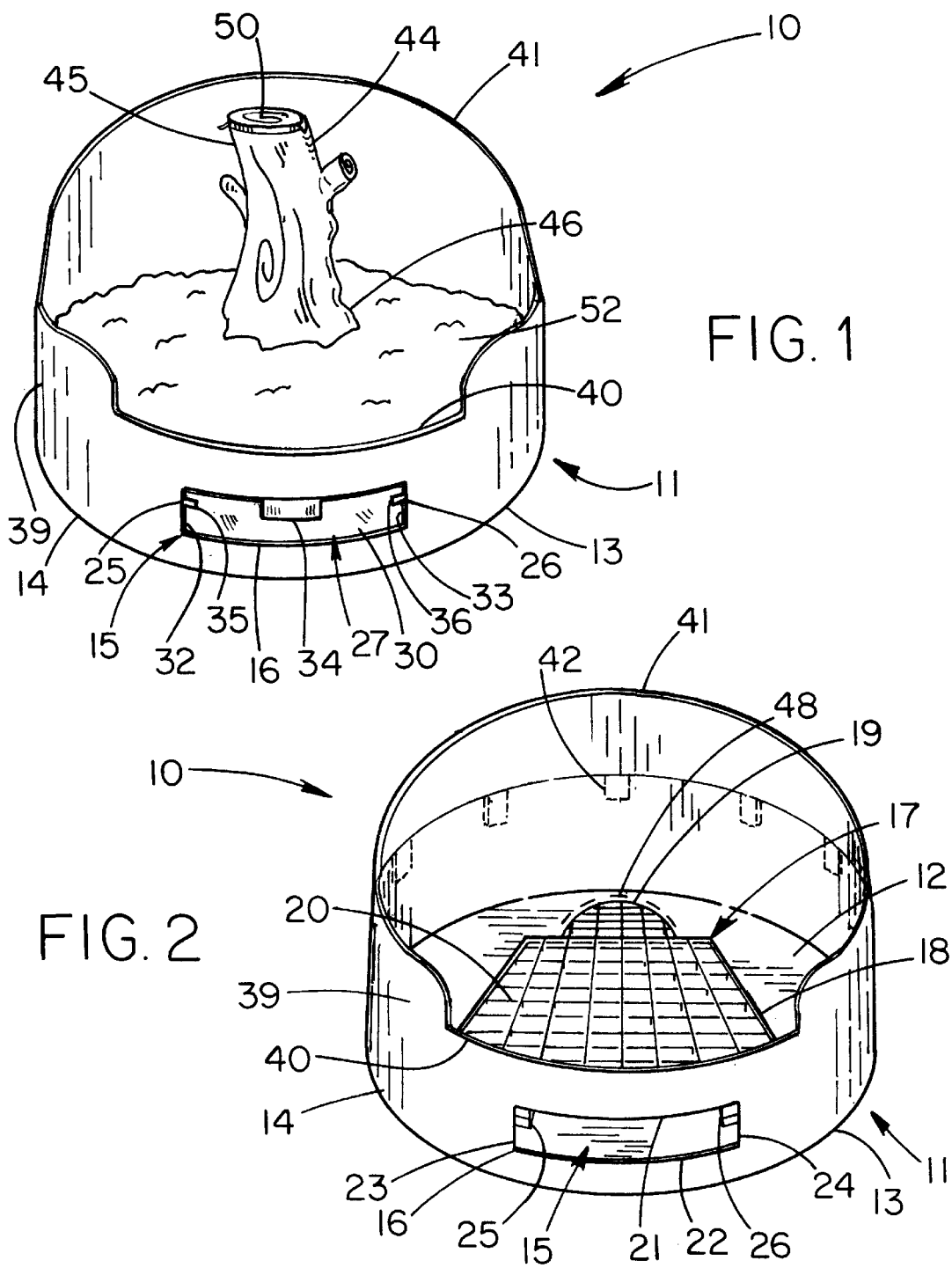

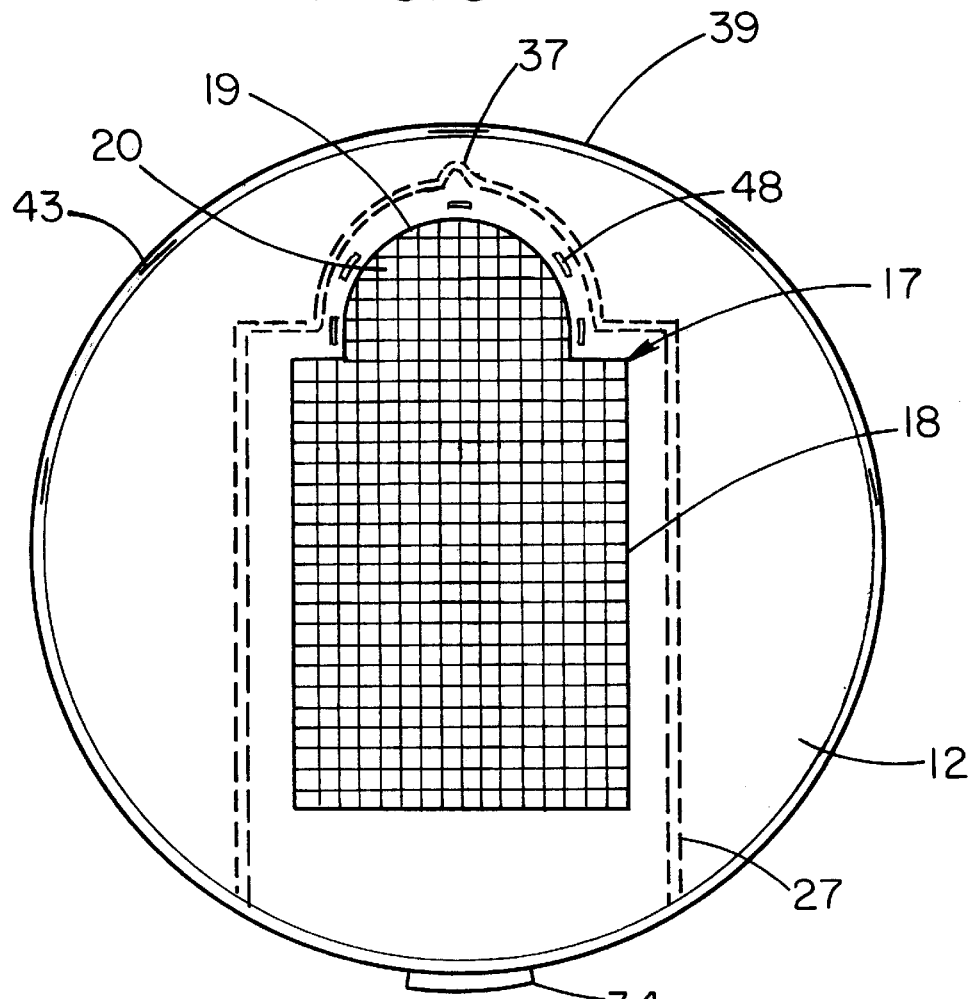
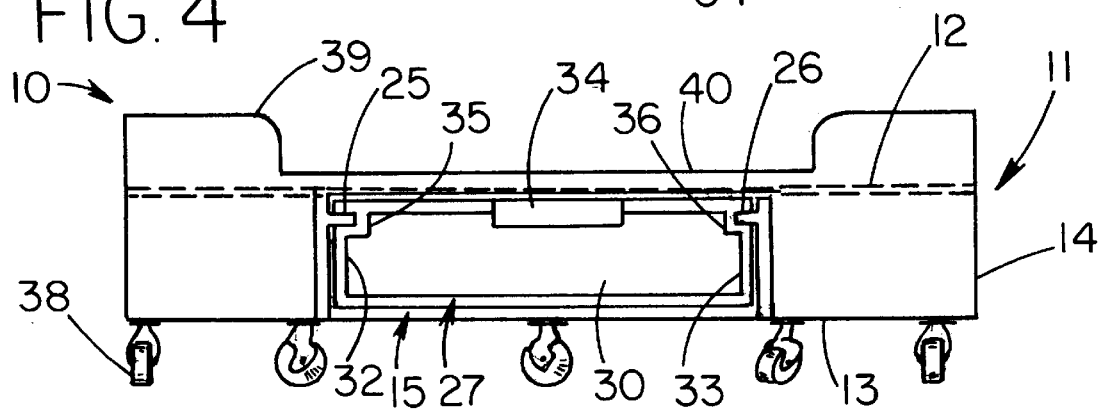

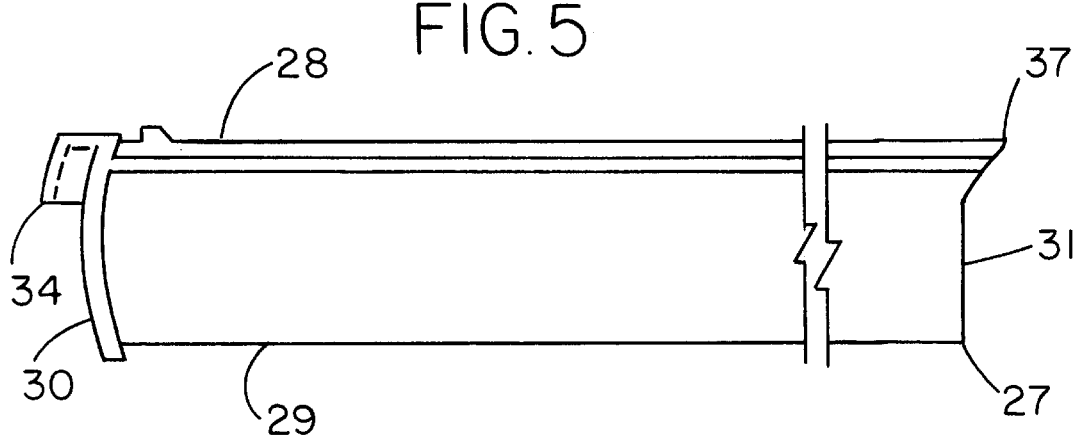
FIG. 5
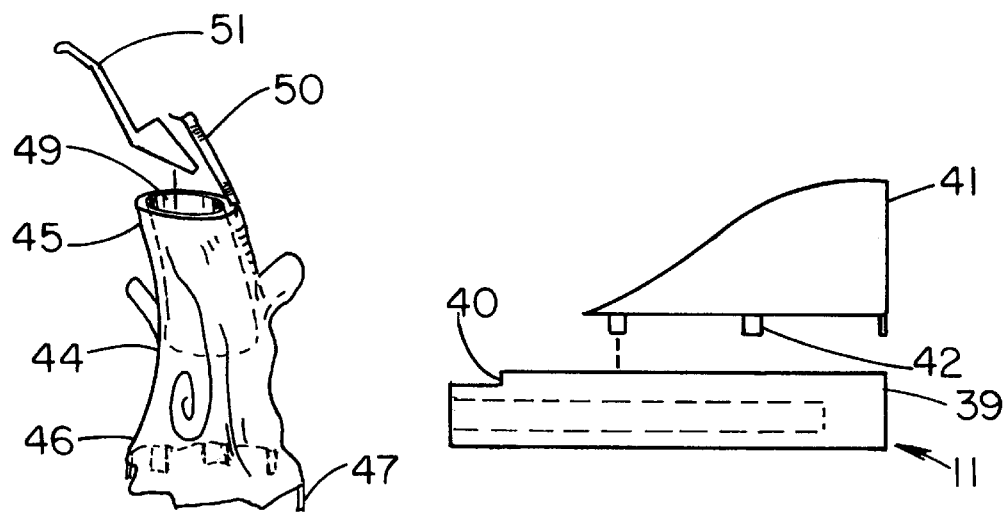
FIG. 6
FIG. 7

CANINE WASTE COLLECTION APPARATUS

CROSS-REFERENCES TO RELATER APPLICATIONS

This application claims benefit of U.S. Provisional Patent Application No. 60/078,376 filed Mar. 18, 1998.

BACKGROUND OF THE INVENTION

1. Field of the Invention

The present invention relates to pet waste collection apparatuses and more particularly pertains to a new canine waste collection apparatus for providing a location where canine pets can deposit their waste so that the waste is collected in a convenient location for easy disposal.

2. Description of the Prior Art

The use of pet waste collection apparatuses is known in the prior art. More specifically, pet waste collection apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,218,930 by Casmira; U.S. Pat. No. 5,713,302 by Walter; U.S. Pat. No. 5,195,464 by Mutter; U.S. Pat. No. 2,741,223 by Winborn, Jr.; U.S. Pat. No. 3,885,523 by Coleman; and U.S. Pat. No. Des. 248,333.

While these devices fulfill their respective, particular objectives and requirements, the aforementioned patents do not disclose a new canine waste collection apparatus. The inventive device includes a base having a cavity therein and a top opening and a side opening into the cavity. A screen covers the top opening to prevent passage of objects greater than a predetermined size through the top opening. A drawer with an open top is slidably inserted through the side opening into the cavity.

In these respects, the canine waste collection apparatus according to the present invention substantially departs from the conventional concepts and designs of the prior art, and in so doing provides an apparatus primarily developed for the purpose of providing a location where canine pets can deposit their waste so that the waste is collected in a convenient location for easy disposal.

SUMMARY OF THE INVENTION

In view of the foregoing disadvantages inherent in the known types of pet waste collection apparatuses now present in the prior art, the present invention provides a new canine waste collection apparatus construction wherein the same can be utilized for providing a location where canine pets can deposit their waste so that the waste is collected in a convenient location for easy disposal.

The general purpose of the present invention, which will be described subsequently in greater detail, is to provide a new canine waste collection apparatus and method which has many of the advantages of the pet waste collection apparatuses mentioned heretofore and many novel features that result in a new canine waste collection apparatus which is not anticipated, rendered obvious, suggested, or even implied by any of the prior art pet waste collection apparatuses, either alone or in any combination thereof.

To attain this, the present invention generally comprises a base having a cavity therein and a top opening and a side opening into the cavity. A screen covers the top opening to prevent passage of objects greater than a predetermined size through the top opening. A drawer with an open top is slidably inserted through the side opening into the cavity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new canine waste collection apparatus and method which has many of the advantages of the pet waste collection apparatuses mentioned heretofore and many novel features that result in a new canine waste collection apparatus which is not anticipated, rendered obvious, suggested, or even implied by any of the prior art pet waste collection apparatuses, either alone or in any combination thereof.

It is another object of the present invention to provide a new canine waste collection apparatus which may be easily and efficiently manufactured and marketed.

It is a further object of the present invention to provide a new canine waste collection apparatus which is of a durable and reliable construction.

An even further object of the present invention is to provide a new canine waste collection apparatus which is susceptible of a low cost of manufacture with regard to both materials and labor, and which accordingly is then susceptible of low prices of sale to the consuming public, thereby making such canine waste collection apparatus economically available to the buying public.

Still yet another object of the present invention is to provide a new canine waste collection apparatus which provides in the apparatuses and methods of the prior art some of the advantages thereof, while simultaneously overcoming some of the disadvantages normally associated therewith.

Still another object of the present invention is to provide a new canine waste collection apparatus for providing a location where canine pets can deposit their waste so that the waste is collected in a convenient location for easy disposal.

Yet another object of the present invention is to provide a new canine waste collection apparatus which includes a base having a cavity therein and a top opening and a side opening into the cavity. A screen covers the top opening to prevent passage of objects greater than a predetermined size through the top opening. A drawer with an open top is slidably inserted through the side opening into the cavity.

Still yet another object of the present invention is to provide a new canine waste collection apparatus that eliminates canine waste in the house, garage or yard.

Even still another object of the present invention is to provide a new canine waste collection apparatus that eliminates the need to "walk the dog," except for exercise.

Still yet another object of the present invention is to provide a new canine waste collection apparatus that eases the clean up of canine waste.

Even still another object of the present invention is to provide a new canine waste collection apparatus that can be easily cleaned and sanitized.

Still yet another object of the present invention is to provide a new canine waste collection apparatus that collects both solid and liquid canine waste such as feces and urine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new canine waste collection apparatus with a tree trunk-shaped member.

FIG. 2 is a schematic perspective view of the present invention with a detachable backsplash.

FIG. 3 is a schematic top view of the base of the present invention without a backsplash attached thereto.

FIG. 4 is a schematic side view of the present invention.

FIG. 5 is a schematic cross sectional view of the drawer.

FIG. 6 is a schematic perspective view of the tree trunk-shaped member.

FIG. 7 is a schematic exploded side view of the embodiment of the present invention with a detachable backsplash.

DESCRIPTION OF THE PREFERRED EMBODIMENT

With reference now to the drawings, and in particular to FIGS. 1 through 7 thereof, a new canine waste collection apparatus embodying the principles and concepts of the present invention and generally designated by the reference numeral 10 will be described.

As best illustrated in FIGS. 1 through 7, the canine waste collection apparatus 10 generally comprises a base having a cavity therein and a top opening and a side opening into the cavity. A screen covers the top opening to prevent passage of objects greater than a predetermined size through the top opening. A drawer with an open top is slidably inserted through the side opening into the cavity.

In closer detail, the canine waste collection apparatus 10 comprises a base 11 for resting on a ground surface which is ideally generally disk-shaped (although it may be fashioned into any desired shape) and has generally circular top and bottom faces 12,13, and a generally cylindrical perimeter side 14 between the top and bottom faces of the base.

The perimeter side of the base has a cavity 15 extending into the base. The cavity is extended from first region of the perimeter side towards a generally diametric second region of the perimeter side. The cavity has an open end (or side opening) 16 at the first region of the perimeter side and a closed end at the second region of the perimeter side.

The top face of the base has a top opening 17 into the cavity. Preferably, as illustrated in FIGS. 2 and 3, the top opening has a generally rectangular main portion 18 and a generally semi-circular end portion 19 continuous with the main portion of the top opening. In use, the top opening is designed for permitting waste from a canine pet to pass from the top face of the base into the cavity via the top opening.

A screen 20 covers the top opening to prevent passage of objects greater than a predetermined size through the top opening. The screen preferably comprises a mesh screen with a plurality of ideally rectangular apertures of the predetermined size therethrough such that objects greater than the predetermined size are blocked from passing through the apertures.

The cavity has a generally rectangular outer periphery comprising spaced apart and generally parallel top 21 and bottom 22, and a pair of generally parallel sides 23,24 extending between the top and bottom of the cavity. As best illustrated in FIGS. 2 and 4, the sides of the cavity each have an elongate rail 25,26 therealong extending into the cavity. Preferably, the rails are extended generally parallel to one another and to the top and bottom of the cavity.

A drawer 27 is slidably inserted into the cavity. In use, the drawer is designed for collecting waste falling into the cavity via the top opening. The drawer has an open top 28, a bottom panel 29, spaced apart front and back panels 30,31 and a pair of side panels 32,33 extending between the front and back panels of the drawer. The front panel of the drawer preferably has a handle 34 for permitting pulling out of the drawer from the cavity. The open top of the drawer facing upwards and is positioned beneath the top opening of the top face of the base such that matter falling through the top opening falls into the drawer via the open top of the drawer. Ideally, as illustrated in FIG. 3, the open top of the drawer has an area greater than the area of the top opening such that nothing falling through the top opening misses falling into the drawer.

Each of the side panels of the drawer has an elongate groove 35,36 therein extending between the front and back panels of the drawer. Each rail of the cavity is slidably inserted into an associated adjacent groove of the drawer.

The back panel of the drawer preferably has a spout 37 adjacent the open top of the drawer for permitting pouring of waster matter collected in the drawer without excessively spilling A plurality of ground engaging wheels 38 are preferably coupled to the bottom face of the base. Even more preferably, the wheels are detachably coupled to the bottom face of the base. Ideally, the wheels comprise swivel casters with at least one of the wheels preferably comprising a locking caster to selectively hold the wheel against rotation to selective prevent rolling of the base across the ground surface.

The base has a generally cylindrical perimeter wall 39 upwardly extending around the perimeter of the top face of the base. The perimeter wall is continuous with the perimeter side of the base. The perimeter wall of the base has a generally rectangular-U-shaped cutout 40 in a first region of the perimeter wall located above the open end of the cavity in the first region of the perimeter side of the base. In use, the cutout is designed for permitting the legs of a canine pet to more easily climb on to the top face of the base.

In a preferred embodiment, ideal for male canine pets, the perimeter wall of the base has an arcuate backsplash 41 upwardly extending from a second region of the perimeter side wall located generally diametrically opposite the first region of the perimeter wall. As illustrated in FIG. 2, in one preferred embodiment, the backsplash may be detachably coupled to the perimeter wall. In such an embodiment, the backsplash has a plurality of spaced apart insertion tabs 42 downwardly extending therefrom which are inserted into corresponding slots 43 in an upper edge of the perimeter wall to detachably couple the backsplash to the perimeter wall. The backsplash has a height at least equal to the height of the perimeter wall such that the overall height of the perimeter wall and backsplash is at least twice the height of the perimeter wall.

In an embodiment particularly for a male canine pet, a preferably hollow tree trunk-shaped member 44 is included with an exterior surface shaped to resemble a tree trunk, and upper and lower ends 45,46. The lower end of the tree trunk-shaped member is coupled to the top face of the base over the end portion of the top opening of the top face of the base such that the tree trunk-shaped member upwardly extends from the top face of the base. Preferably, the lower end of the tree trunk-shaped member is detachably coupled to the top face of the base. In such a preferred embodiment, ideally, the lower end of the tree trunk-shaped member has a plurality of spaced apart insertion tabs 47 downwardly extending therefrom and inserted into corresponding slots 48 in the top face of the base adjacent an outer periphery of the end portion of the top opening of the top face to detachably couple the lower end of the tree trunk-shaped member to the top face of the base.

In use, the tree trunk-shaped member is designed for providing a structure for male canine pets standing on the top face of the base to raise a hind leg and urinate thereon. The backsplash is designed for deflecting any urine from the male canine pet that is not directed downwards to protect the area surrounding the back of the base from urine spray and spillage during use of the apparatus by a male canine.

The upper end of the tree trunk-shaped member has a hole 49 into the tree trunk-shaped member. The upper end of the tree trunk-shaped member also has a lid 50 pivotally coupled thereto and substantially covering the hole of the upper end of the tree trunk-shaped member. A scoop 51 is disposed in the hole of the upper end of the tree trunk-shaped member. In use, the scoop is designed for scooping up feces and other solid waste a canine pet leaves on the top face of the base.

A layer of a particulate substance 52 is spread on to the top face of the base to cover the top face of the base including the top opening of the top face of the base. The particulate substance has a size greater than the predetermined size of the apertures of the screen so that the particulate substance does not fall through the top opening into the cavity Preferably, the particular substance comprises gravel. Ideally, the gravel is of the type commonly known as "pea gravel." In use, the particulate substance is designed for preventing solid waste (such as feces) deposited by the canine pet on the top face of base from falling through the top opening and for permitting easy collection of the solid waste with the scoop for convenient and relatively mess free disposal of the solid waste.

In use, when the canine pet is positioned on the top face of the base to defecate, the urine of the pet flows into the drawer via the top opening while the feces of the pet is deposited on the layer of the particulate substance. To clean up the waste, the drawer is slid out of the cavity to dispose of the urine collected therein and the feces is scooped off of the particulate substance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal waste collection apparatus, comprising:
    a base having a cavity therein and a top opening and a side opening into said cavity;
    a screen covering said top opening to prevent passage of objects greater than a predetermined size through said top opening; and
    a drawer having an open top and being slidably inserted through said side opening into said cavity;
    wherein said base has an upwardly extending perimeter wall therearound, said perimeter wall of said base having a cutout located above said side opening into said cavity.

2. The animal waste collection apparatus of claim 1, wherein said top opening has a generally rectangular main portion and a generally semi-circular end portion continuous with said main portion of said top opening.

3. The animal waste collection apparatus of claim 1, wherein said cavity has a pair elongate rails, wherein said drawer has a pair of elongate grooves, and wherein each rail of said cavity is slidably inserted into an associated adjacent groove of said drawer.

4. The animal waste collection apparatus of claim 1, wherein said drawer has a spout adjacent said open top of said drawer.

5. The animal waste collection apparatus of claim 1, further comprising a plurality of ground engaging wheels being coupled to said base.

6. The animal waste collection apparatus of claim 1, wherein said perimeter wall has a backsplash upwardly extending therefrom.

7. The animal waste collection apparatus of claim 1, further comprising a tree trunk-shaped member having an exterior surface shaped to resemble a tree trunk, and upper and lower ends, wherein said lower end of said tree trunk-shaped member is coupled to said base.

8. The animal waste collection apparatus of claim 7, wherein said upper end of said tree trunk-shaped member has a hole into said tree trunk-shaped member, and wherein said upper end of said tree trunk-shaped member has a lid pivotally coupled thereto and substantially covering said hole of said upper end of said tree trunk-shaped member.

9. The animal waste collection apparatus of claim 8, further comprising a scoop being disposed in said hole of said upper end of said tree trunk-shaped member.

10. The animal waste collection apparatus of claim 1, further comprising a particulate substance being spread on base over said top opening of said base.

11. An animal waste collection apparatus, comprising:

a base, being generally disk-shaped and having generally circular top and bottom faces, and a generally cylindrical perimeter side between said top and bottom faces of said base;

said perimeter side of said base having a cavity extending into said base;

said cavity being extended from first region of said perimeter side towards a generally diametric second region of said perimeter side;

said cavity having an open end at said first region of said perimeter side and a closed end at said second region of said perimeter side;

said top face of said base having a top opening into said cavity;

said top opening having a generally rectangular main portion and a generally semi-circular end portion continuous with said main portion of said top opening;

a screen covering said top opening to prevent passage of objects greater than a predetermined size through said top opening;

said cavity having a generally rectangular outer periphery comprising spaced apart and generally parallel top and bottom, and a pair of generally parallel sides extending between said top and bottom of said cavity;

said sides of said cavity each having an elongate rail therealong extending into said cavity;

said rails being extended generally parallel to one another and to said top and bottom of said cavity;

a drawer being slidably inserted into said cavity;

said drawer having an open top, a bottom panel, spaced apart front and back panels and a pair of side panels extending between said front and back panels of said drawer;

said open top of said drawer being positioned beneath said top opening of said top face of said base;

said front panel of said drawer having a handle;

each of said side panels of said drawer having an elongate groove therein extending between said front and back panels of said drawer;

each rail of said cavity being slidably inserted into an associated adjacent groove of said drawer;

said back panel of said drawer having a spout adjacent said open top of said drawer;

a plurality of ground engaging wheels being coupled to said bottom face of said base;

said base having a perimeter wall upwardly extending around said top face of said base, said perimeter wall being continuous with said perimeter side of said base;

said perimeter wall of said base having a generally rectangular-U-shaped cutout in a first region of said perimeter wall located above said open end of said cavity in said first region of said perimeter side of said base;

said perimeter wall of said base having a backsplash upwardly extending from a second region of said perimeter side wall located generally diametrically opposite said first region of said perimeter wall;

a tree trunk-shaped member having an exterior surface shaped to resemble a tree trunk, and upper and lower ends;

said lower end of said tree trunk-shaped member being coupled to said top face of said base over said end portion of said top opening of said top face of said base such that said tree trunk-shaped member upwardly extends from said top face of said base;

said upper end of said tree trunk-shaped member having a hole into said tree trunk-shaped member, said upper end of said tree trunk-shaped member having a lid pivotally coupled thereto and substantially covering said hole of said upper end of said tree trunk-shaped member;

a scoop being disposed in said hole of said upper end of said tree trunk-shaped member; and a particulate substance being spread on to said top face of said base to cover said top face of said base including said top opening of said top face of said base.

12. An animal waste collection apparatus, comprising:

a base having a cavity therein and a top opening and a side opening into said cavity;

a screen covering said top opening to prevent passage of objects greater than a predetermined size through said top opening;

a drawer having an open top and being slidably inserted through said side opening into said cavity; and a tree trunk-shaped member having an exterior surface shaped to resemble a tree trunk, and upper and lower ends, wherein said lower end of said tree trunk-shaped member is coupled to said base.

13. The animal waste collection apparatus of claim 12, wherein said drawer has a spout adjacent said open top of said drawer.

14. The animal waste collection apparatus of claim 12, further comprising a plurality of ground engaging wheels being coupled to said base.

15. The animal waste collection apparatus of claim 12, wherein said base has an upwardly extending perimeter wall therearound.

16. The animal waste collection apparatus of claim 15, wherein said perimeter wall has a backsplash upwardly extending therefrom.

17. The animal waste collection apparatus of claim 12, wherein said upper end of said tree trunk-shaped member has a hole into said tree trunk-shaped member, and wherein said upper end of said tree trunk-shaped member has a lid pivotally coupled thereto and substantially covering said hole of said upper end of said tree trunk-shaped member.

18. The animal waste collection apparatus of claim 17, further comprising a scoop being disposed in said hole of said upper end of said tree trunk-shaped member.

19. The animal waste collection apparatus of claim 12, further comprising a particulate substance being spread on base over said top opening of said base.

* * * * *